(12) United States Patent
Freeman

(10) Patent No.: US 7,193,412 B2
(45) Date of Patent: Mar. 20, 2007

(54) TARGET ACTIVATED SENSOR

(75) Inventor: Mark Freeman, Framingham, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 11/089,042

(22) Filed: Mar. 24, 2005

(65) Prior Publication Data

US 2005/0225317 A1    Oct. 13, 2005

Related U.S. Application Data

(60) Provisional application No. 60/555,787, filed on Mar. 24, 2004.

(51) Int. Cl.
*G01B 7/14* (2006.01)
*G01R 33/07* (2006.01)

(52) U.S. Cl. ............... 324/207.24; 324/251; 324/207.2

(58) Field of Classification Search ........... 324/207.24, 324/207.2, 251
See application file for complete search history.

(56) References Cited

U.S. PATENT DOCUMENTS

| 6,921,107 B2 * | 7/2005 | Mills et al. .................. 280/735 |
| 7,005,848 B2 * | 2/2006 | Suzuki et al. .......... 324/207.26 |
| 2002/0005715 A1 * | 1/2002 | Sato ........................ 324/207.2 |

* cited by examiner

*Primary Examiner*—Bot LeDynh
(74) *Attorney, Agent, or Firm*—Grossman, Tucker, Perreault & Pfleger, PLLC

(57) ABSTRACT

A target activated sensor including a magnet, a magnetic field sensing element located proximate the magnet and a single ferrous pole located proximate the sensing element. The sensing element senses a change in magnetic field caused by the presence of a target. The magnet, sensing element and single pole piece may be combined in a single package.

19 Claims, 4 Drawing Sheets

TARGET ACTIVATED SENSOR

CROSS-REFERENCE TO RELATED APPLICATIONS

The present application claims the benefit of the filing date of U.S. Provisional Application Ser. No. 60/555,787, filed Mar. 24, 2004, the teachings of which are incorporated herein by reference.

TECHNICAL FIELD

The present application relates to position sensors and more particularly, to a target activated sensor that provides and output indicative of the position of a target relative thereto.

BACKGROUND

In a wide variety of applications it is advantageous or necessary to sense the position of a linearly or rotationally movable element. For example, in automobile seat applications the seat may be linearly movable, either manually or automatically via electro-mechanical means, on an associated track assembly. A sensor may provide a signal representative of the linear position of the seat on the track for a variety of purposes, e.g. to control deployment of an air bag, to control the electromechanical actuator that causes translation of the seat in connection with a seat position memory feature, etc.

For a seat position application, it is increasingly desirable for a sensor to provide multiple position outputs for purposes of ascertaining occupant position. For example, in applications where seat position is used to control air bag deployment early configurations involved only single stage air bag systems. A single stage air bag deploys with a known deployment force that may not be varied. In this application, seat position information was used only to determine when the airbag should be deployed. However, the advent of dual stage air bags, i.e. air bags that may be deployed with two distinct deployment forces, required increased resolution in position sensing. Also, the industry is now moving to variable stage airbags where the deployment force may be varied depending upon occupant position and classification. Variable stage airbag configurations require a sensor configuration that can detect multiple seat positions for use in determining the appropriate deployment force.

Another desirable feature of a position sensor, especially in the context of an automobile seat application, is that it be a non-contact sensor. A non-contact sensor includes a sensing element that does not physically contact the sensed object, allowing quiet operation of the sensor and minimizing wear. Preferably, the sensor operates with a relatively large air gap between the sensor and the sensed object to avoid inadvertent contact due to manufacturing or assembly variances.

Another issue associated with seat position sensors is that the seat track environment is very crowded with limited physical space for such sensors. Also the space available for the sensor may vary among vehicle types. As such, sensors which are compact in size are desirable.

Accordingly, there is a need for a seat position sensor that is compact in size and is configured to operate with a relatively large air gap.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

DETAILED DESCRIPTION

For ease of explanation, sensor systems consistent with the invention will be described herein in connection with an automobile seat position sensing application. It will be recognized, however, that sensor systems consistent with the invention will be useful in other applications. In addition, exemplary embodiments described herein include use of Hall Effect sensors and a magnet. Those skilled in the art will recognize, however, that a variety of sensing means may be used. For example, optical, magneto-resistive, fluxgate sensors, etc. may be useful in connection with a sensor system consistent with the invention. It is to be understood, therefore, that illustrated exemplary embodiments described herein are provided only by way of illustration, and are not intended to be limiting.

Figure 1:
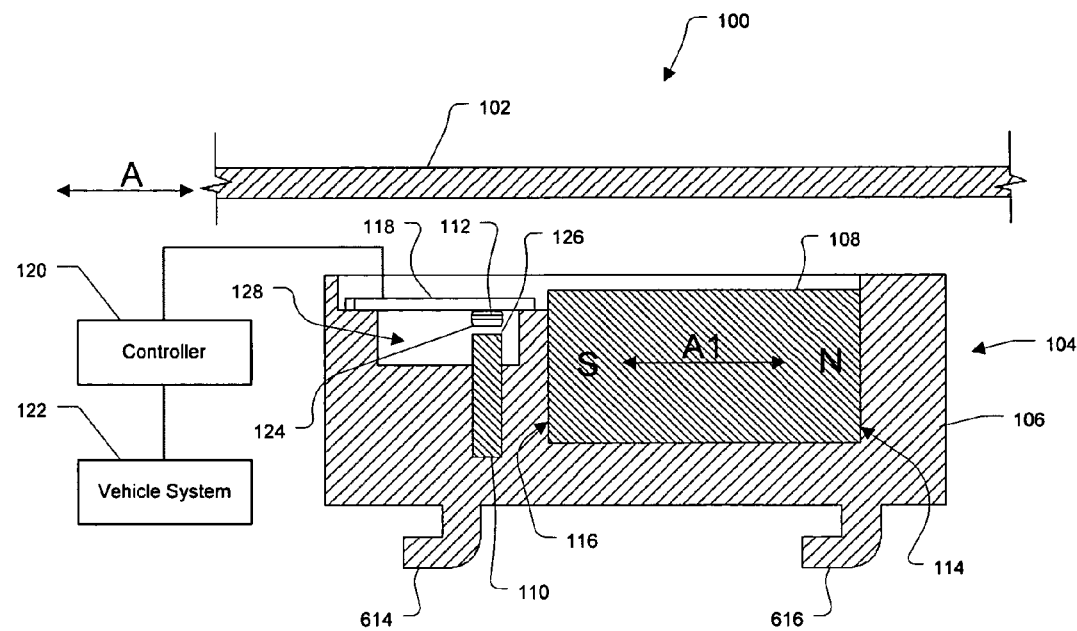
FIG. 1 is a schematic illustration in partial side-sectional view of an exemplary target activated position sensor consistent with the present invention.

Referring to FIG. 1, one exemplary target activated sensor system 100 consistent with the present invention is shown in detail. The illustrated exemplary sensor system includes a target or flag 102 and a sensor assembly 104 including a sensor housing 106 carrying a magnet 108, a single pole 110 and a magnetic field sensing element 112. In general, the sensor assembly 104 and target 102 may be mounted in a system, e.g. a seat position sensing system, in a manner allowing relative movement therebetween. For example, the target 102 may be affixed to a movable rail of a seat assembly and the sensor assembly 104 may be mounted to a fixed rail of a seat assembly, or vice versa.

When the target 102 is at a distance from the sensor assembly 104 a first level of magnetic flux from the magnet may be imparted to the magnetic sensor element 112, resulting in a first output from the sensor 112. When the target 102 is positioned proximate the sensor assembly 104, as shown, for example in FIG. 1, the target 102 may cause an increased level of magnetic flux to be imparted to the magnetic sensor element 112, compared to the first level of flux, resulting in a second output from the sensor 122. The output level of the magnetic sensor element 112 may thus be indicative of the position of the target 102 relative to the sensor assembly 104. When, for example, the target 102 is affixed to a movable rail of a seat assembly and the sensor assembly 104 is affixed to a stationary rail of the seat assembly, the output of the sensor 112 is indicative of the position of the movable rail and the seat affixed thereto, relative to the stationary rail.

With continued reference to FIG. 1, the target 102 may be constructed form a ferromagnetic material and may be configured to move relative to the sensor assembly in a direction indicated by arrow A. The magnet 108 may be disposed at least partially in the housing 106 and may be magnetized in a direction indicated by arrow A1 which is substantially parallel, e.g. within manufacturing and assembly tolerances, to the direction of movement of the target 102. In one embodiment, for example, the magnet 108 may be magnetized such that a first end 114 represents a north (N) pole of the magnet and a second end 116 represents a south (S) pole of the magnet.

The single pole 110 may be constructed from a ferromagnetic material and may be of unitary or multi-piece construction. The pole 110 may be disposed in the housing at a fixed distance from the end 116 of the magnet and within the magnetic field established by the magnet. In the illustrated exemplary embodiment, the magnetic sensor element 112 is affixed to a printed circuit board (PCB) 118. The PCB 118 may carry conductive paths and/or electronics for communicating the sensor element outputs to a controller 120 for controlling a vehicle system 122, e.g. a vehicle air bag, seat position controller, etc., in response, at least in part, to the outputs of the sensor element 112.

In one exemplary embodiment, the magnetic sensor element 112 may be configured as a Hall Effect sensor positioned on the PCB 118 with a flux receiving surface 124 of the sensor spaced from and in opposing relationship to an end surface 126 of the single pole 110. The output of the Hall Effect sensor may vary in response to the level of flux density imparted to the flux receiving surface 124. The flux receiving surface 124 of the sensor may thus be substantially parallel, e.g. within manufacturing and assembly tolerances, to the direction of magnetization of the magnet 108, as indicated by arrow A1. Placing the sensor element 112 in this position relative to the direction of the magnetization of the magnet 108 can, compared to other orientations, reduce the vector component of the magnetic field from the magnet that affects the sensor.

In one exemplary embodiment, the Hall Effect sensor may be a well-known and commercially available solid state, low current device with diagnostic capability. A two terminal Hall Effect sensor may be used to achieve operation over a wide voltage and temperature range and provide two current output levels, e.g. 5.5 mA and 15 mA. A programmable Hall Effect sensor may be used to allow selection of the Hall switch point.

Figure 3:
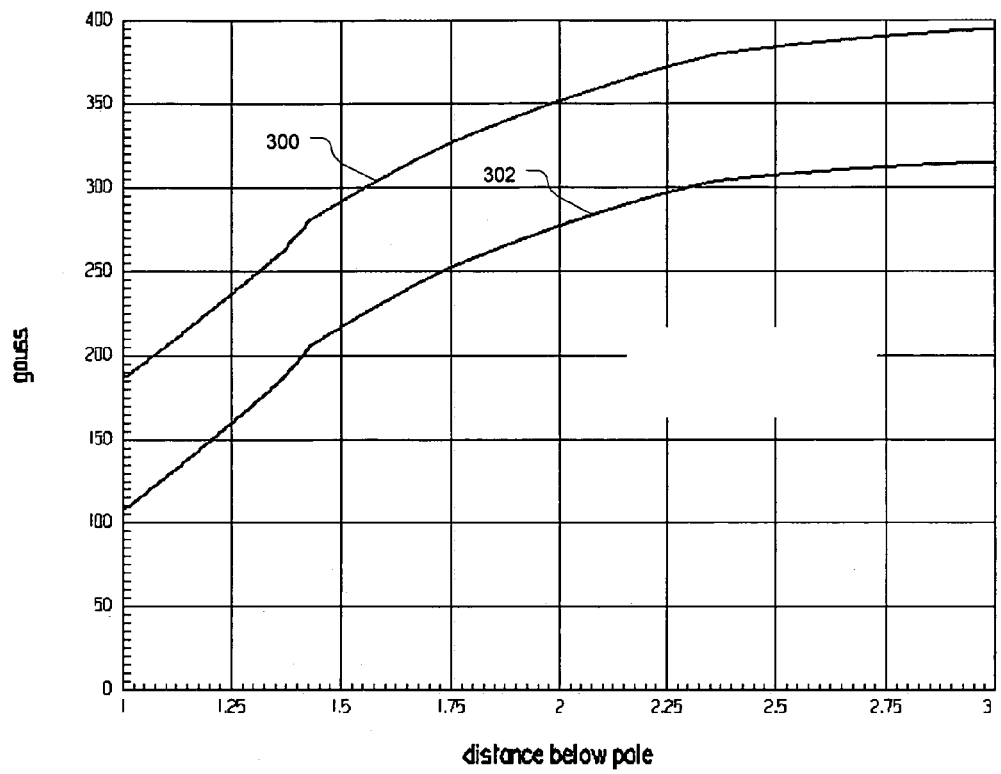
FIG. 3 includes plots of gauss vs. distance showing magnetic flux at various distances from an end of a single pole when a target is present and when a target is not present in an exemplary target activated position sensor consistent, with the present invention.

The housing 106 may include a cavity 128 for receiving the end surface 126 of the pole piece and the magnetic sensor element 112. The PCB 118 may extend across the cavity 128 to opposing sides thereof, and may be sealed within the housing by a housing cover 130, e.g. as shown in FIG. 3. Sealing of the cover 130 over the PCB 118 may be accomplished by a variety of means including, but not limited to, a perimeter seal, grommet, o-ring, epoxy, ultrasonic welding, over-molding, etc. The cover 130 may extend over the magnet 108 to seal the magnet within the housing 106, or may leave the magnet 108 exposed at an open side of the housing 106 to allow close positioning of the magnet to the target 102.

Figure 2:
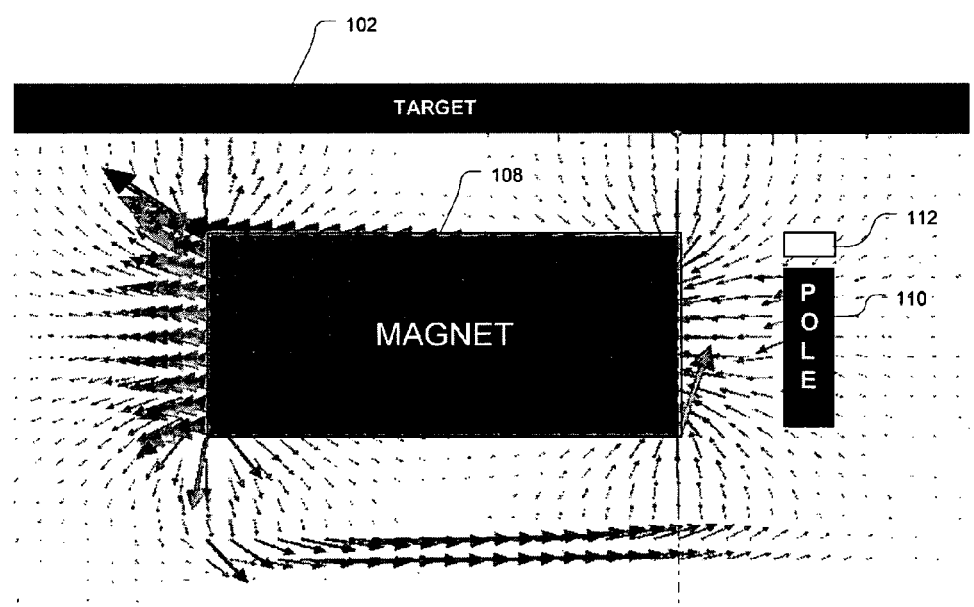
FIG. 2 is a schematic diagram showing the magnetic fields associated with an exemplary target activated position sensor consistent with the present invention.

Turning now to FIG. 2, the target 102 may be positioned relative to the sensor assembly to direct an increased magnetic flux through the magnetic sensor element 112, with no intervening ferromagnetic pole between the sensor and the target, compared to when the target 102 is not in proximity to the sensor assembly. FIG. 3 includes plots 300 and 302 of magnetic flux (gauss) at various distances from the end surface 126 of the pole 110, i.e. moving in the direction of the target 102 shown in FIG. 1. Plot 300 is a plot of gauss vs. distance from the pole 110 when a target 102 is present at 6 mm from the pole, and plot 302 is a plot of gauss vs. distance from the pole 110 when no target 102 is present.

As shown, when the target 102 is present the flux is greater at distances from the end surface 126 of the pole 110, i.e. in the location of the magnetic sensor 112, than when no target 102 is present. In addition, the difference (delta) between the flux present at a particular distance from the pole when the target 102 is present and when the target 102 is not present is about 80 gauss or more over a range of distances from 1 mm to 3 mm. The relative positioning of the components 108, 110 and 112 may be chosen to achieve a desired delta (target present-not present) to accommodate a particular Hall Effect sensor selection, and/or a programmable Hall Effect sensor may be used to compensate for opening manufacturing tolerances.

Figure 4:
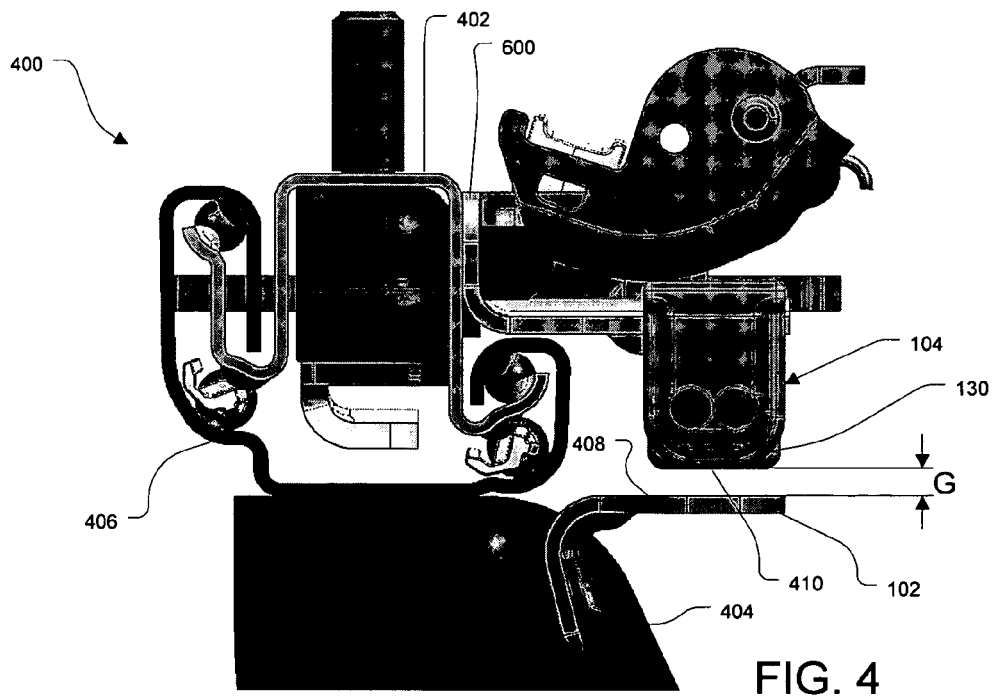
FIG. 4 is an end view of a portion of a vehicle seat assembly incorporating an exemplary target activated position sensor showing the target positioned in proximity to the sensor.
Figure 5:
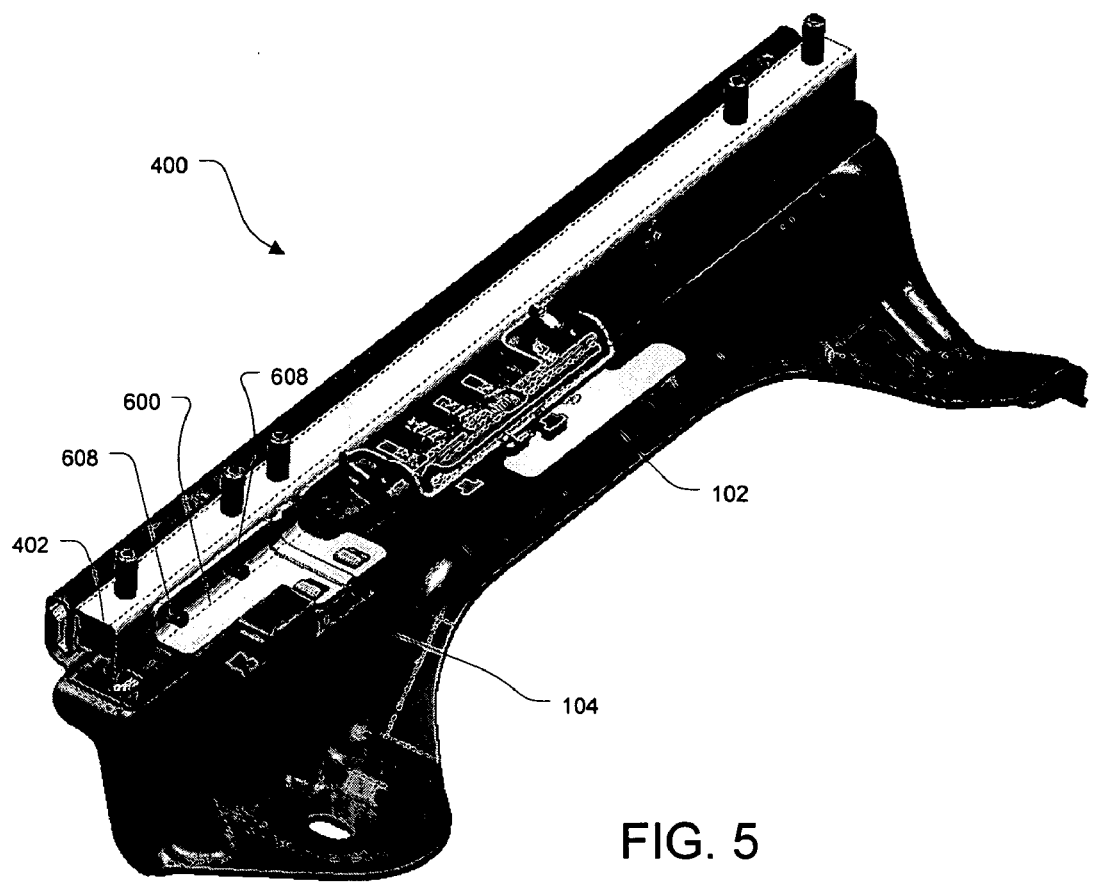
FIG. 5 is a side perspective view of the assembly shown in FIG. 4 showing the target positioned at a distance form the sensor.

FIGS. 4 and 5 show an exemplary application of the target activated sensor system consistent with the present invention configured for sensing the position of a vehicle seat (not shown) affixed to a vehicle seat assembly 400. In the illustrated embodiment, the sensor assembly 104 is mounted on a movable rail 402 of the seat assembly 400 and moves relative to the target 102 (e.g., a flag) which is mounted to a fixed portion of the seat assembly 400, e.g. via a fastener 404. Alternatively, the sensor assembly 104 may be fixed and the target 102 may be movable. Also, one of the target or sensor assembly may be directly affixed to the stationary rail 406 of the seat assembly.

As shown, the target 102 may be positioned with a surface 408 thereof in opposed facing relationship to a bottom surface 410 of the sensor assembly 104 and the magnet to establish an air gap G between the magnet of the sensor assembly 104 and the target 102. In one embodiment, the air gap G may be 3 mm±2 mm. Advantageously, however, a sensor system consistent with the invention may be configured with an air gap in excess of 5 mm. Use of a magnet 108 that is relatively long compared to its width contributes to the large air gap, while allowing use of a low grade magnet. In one embodiment, for example, the magnet 108 may have a length in its direction of magnetization of about 22–23 mm, a width of about 7–8 mm, and a height of about 9–10 mm.

Figure 6:
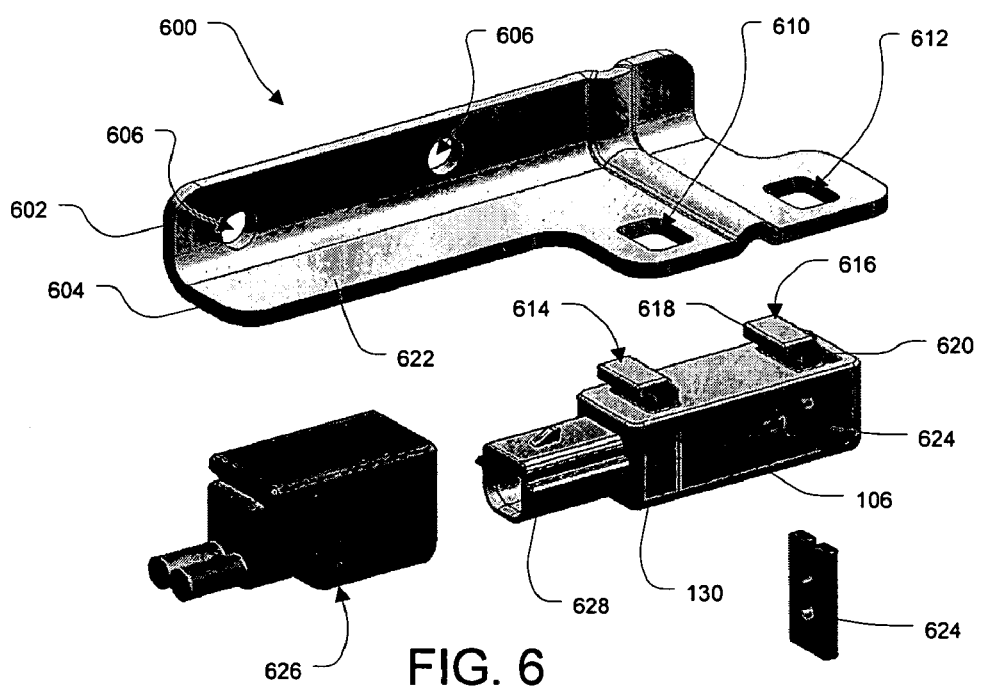
FIG. 6 is an exploded view of one exemplary housing and mounting bracket configuration useful in connection with a target activated position sensor consistent with the present invention.

With reference also to FIG. 6, the sensor assembly 104 may be mounted to the seat assembly 400 through a mounting bracket 600. The mounting bracket 600 may be constructed from a ferrous or non-ferrous material and may be generally L-shaped including first 602 and second 604 arms. A first arm 602 of the bracket 600 may include openings 606 therein for receiving corresponding studs 608 (FIG. 5) extending from a side surface of the movable rail 402 of the seat assembly 400. The studs 608 may pass through the openings 606 and may be secured against removal from the openings, e.g. by welding or an appropriate clip or fastener.

The second arm 604 of the bracket may include first 610 and second 612 mounting openings for receiving first 614 and second 616 associated mounting flanges extending from the housing. Each of the mounting flanges may be generally L-shaped having a first arm 618 and a second arm 620. To mount the sensor assembly to the bracket 600, the flanges 614, 616 may be passed through the associated openings 610, 612 and the first arms 618 may be positioned to overlay the top surface 622 of the bracket adjacent the openings 610, 612. Play between the mounting flanges 614, 6116 and the openings 610, 612 may be removed by a positive locking clip 624 inserted between the flanges and the rear surfaces of the openings and into the housing 106. Electrical connections from the PCB 118 to, for example, the controller 120 may be established through a connector 626 configured to securely mate with an associated receptacle 628 extending from the housing 106.

Advantageously, a sensor system with a single pole consistent with the present invention may be operated at a large air gap and may be provided in a compact package. In one embodiment, the sensor assembly 104, as shown in FIG. 1 may have dimensions of about 15 mm×15 mm×35 mm, excluding the mounting flanges 614, 616. This small size is accommodating the limited space available in existing seat track assemblies.

Figure 7:
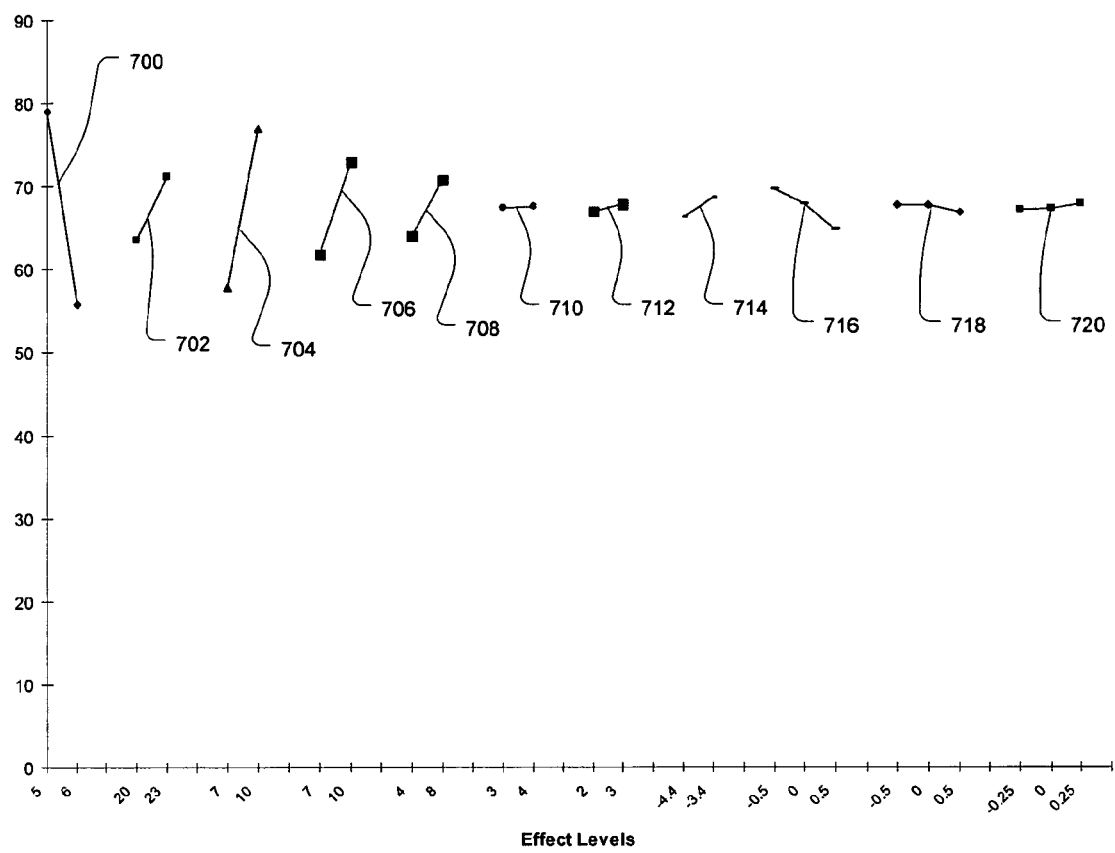
FIG. 7 includes plots of the difference in flux sensed by a magnetic sensor element when a target is present and not present vs. dimension showing the effect on the difference resulting from variation the dimension of eleven different component and tolerance variables associated with an exemplary target activated position sensor consistent with the present invention.

Another advantage of the sensor assembly including a single pole consistent with the invention is robustness to manufacturing and assembly tolerances of the components. FIG. 7, for example, includes plots of the delta (target present-not present) in gauss vs. eleven different variable component and assembly dimensions. Plot 700–720 are plots of delta vs. air gap, magnet length, magnet width, magnet height, pole height, pole width, pole thickness, the distance from a Hall sensor sensing element to the magnet, and the hall sensor x, y and z position tolerances, respectively, for an exemplary embodiment of a sensor assembly 104 consistent with the present invention. As shown, the delta shows little change if the eleven variables are varied up to ten times greater than the variation would be in production. In addition, the variables with the greatest affect on delta are generally component tolerances not assembly tolerances. Thus, a sensor consistent with the present invention enables less precision and more efficiency in manufacturing.

Consistent with one aspect of the present invention, therefore, there is provided apparatus for sensing the position of a seat in a vehicle including: a permanent magnet establishing a magnetic field; a single pole spaced from the permanent magnet and disposed in the magnetic field; a magnetic sensor element disposed in the magnetic field and adjacent an end of the single pole; and a target comprising a ferromagnetic material. At least one of the target and the sensor assembly being configured for movement with the seat relative to the other of the target and the sensor assembly, whereby in at least one position of the at least one movable one of the target and the sensor assembly the target is disposed in the magnetic field and the magnetic sensor element is disposed between the end of the single pole and the target with no intervening ferromagnetic pole between the magnetic sensor element and the target. The sensor element is configured to provide a first output in response to a first level of magnetic flux from the magnet directed to the sensor element when the sensor element is disposed between the end of the single pole and the target, and a second output different from the first output in response to a second level of magnetic flux from the magnet directed to the sensor element when the sensor element is not disposed between the end of the single pole and the target.

Consistent with another aspect of the present invention, there is provided an apparatus for sensing the position of a seat in a vehicle including: a permanent magnet magnetized in a direction of magnetization for establishing a magnetic field; a single pole spaced from the permanent magnet and disposed in the magnetic field; a magnetic sensor element disposed in the magnetic field and adjacent an end of the single pole, the magnetic sensor element having a flux receiving surface and being responsive to first and second levels of flux imparted to the flux receiving surface for providing first and second outputs, respectively, the first output being different from the second output, the flux receiving surface being positioned substantially parallel to the direction of magnetization; a housing, the permanent magnet, the single pole and the magnetic sensor element being at least partially disposed in the housing; and a target including a ferromagnetic material. At least one of the target and the sensor assembly being configured for movement with the seat relative to the other of the target and the sensor assembly the movement being in a direction substantially parallel to the direction of magnetization, whereby in at least one position of the at least one movable one of the target and the sensor assembly the target is disposed in the magnetic field and the magnetic sensor element is disposed between the end of the single pole and the target with no intervening ferromagnetic pole between the magnetic sensor element and the target. The sensor element is configured to provide the first output in response to the first level of magnetic flux when the sensor element is disposed between the end of the single pole and the target and the second output when the sensor element is not disposed between the end of the single pole and the target.

Consistent with a further aspect of the present invention, there is provided an apparatus including a permanent magnet magnetized in a direction of magnetization for establishing a magnetic field; a single pole spaced from the permanent magnet and disposed in the magnetic field; and a Hall Effect device disposed in the magnetic field and adjacent an end of the single pole, the Hall Effect device having a flux receiving surface and being responsive to first and second levels of flux imparted to the flux receiving surface for providing first and second outputs, respectively, the first output being different from the second output, the flux receiving surface being positioned substantially parallel to the direction of magnetization. The Hall Effect device is configured to provide the first output when a target is disposed in the magnetic field and the Hall Effect device is disposed between the end of the single pole and the target with no intervening ferromagnetic pole between the Hall Effect device and the target. The Hall Effect device is further configured to provide the second output when Hall Effect device is not disposed between the end of the single pole and the target.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An apparatus for sensing the position of a seat in a vehicle, said apparatus comprising:
a permanent magnet having a direction of magnetization and establishing a magnetic field;
a single pole spaced from said permanent magnet and having a surface in opposed facing relationship with one magnetic pole of said permanent magnet, said single pole disposed in said magnetic field;
a magnetic sensor element disposed in said magnetic field and adjacent an end of said single pole, said magnetic sensor element having a flux receiving surface, said flux receiving surface in opposed facing relationship to said end of said single pole and being positioned substantially parallel to said direction of magnetization; and
a target comprising a ferromagnetic material,
at least one of said target and a sensor assembly, comprising said permanent magnet, said single pole and said magnetic sensor element, being configured for movement with said seat relative to the other of said target and said sensor assembly, whereby in at least one position of said at least one movable one of said target and said sensor assembly said target is disposed in said magnetic field and said magnetic sensor element is disposed between said end of said single pole and said target with no intervening ferromagnetic pole between said magnetic sensor element and said target,
said sensor element being configured to provide a first output in response to a first level of magnetic flux from said magnet directed to said sensor element when said sensor element is disposed between said end of said single pole and said target and a second output different from said first output in response to a second level of magnetic flux from said magnet directed to said sensor element when said sensor element is not disposed between said end of said single pole and said target.

2. An apparatus according to claim 1, wherein said direction of magnetization of said permanent magnet is substantially parallel to a direction of movement of said at least one movable one of said seat and said sensor assembly.

3. An apparatus according to claim 2, wherein said sensor element comprises a Hall Effect device, said Hall Effect device being responsive to said first and second levels of magnetic flux imparted to said flux receiving surface to provide said first and second outputs, said flux receiving surface being positioned substantially parallel to said direction of magnetization.

4. An apparatus according to claim 2, wherein said magnet has a length in said direction of magnetization, said length being greater than a width and height of said magnet.

5. An apparatus according to claim 1, wherein an air gap between said magnet and said target is greater than 5 mm.

6. An apparatus according to claim 1, wherein said permanent magnet, said single pole, and said magnetic sensor element are at least partially disposed in a housing and said magnetic sensor element and said end of said single pole are disposed in a sealed cavity at least partially formed by said housing.

7. An apparatus according to claim 1, wherein said permanent magnet, said single pole, and said magnetic sensor element are at least partially disposed in a housing, said housing comprising at least one mounting flange extending from an exterior surface thereof, said mounting flange being configured for cooperating with an associated mounting opening of a mounting bracket for affixing said apparatus to said mounting bracket.

8. An apparatus for sensing the position of a seat in a vehicle, said apparatus comprising:
a permanent magnet magnetized in a direction of magnetization for establishing a magnetic field;
a single pole spaced from said permanent magnet and having a surface in opposed facing relationship with one magnetic pole of said permanent magnet, said single pole disposed in said magnetic field;
a magnetic sensor element disposed in said magnetic field and adjacent an end of said single pole, said magnetic sensor element having a flux receiving surface and being responsive to first and second levels of flux imparted to said flux receiving surface for providing first and second outputs, respectively, said first output being different from said second output, said flux receiving surface being positioned substantially parallel to said direction of magnetization and in opposed facing relationship to said end of said single pole;
a housing, said permanent magnet, said single pole and said magnetic sensor element being at least partially disposed in said housing; and
a target comprising a ferromagnetic material,
at least one of said target and a sensor assembly, comprising said permanent magnet, said single pole and said magnetic sensor element, being configured for movement with said seat relative to the other of said target and said sensor assembly said movement being in a direction substantially parallel to said direction of magnetization, whereby in at least one position of said at least one movable one of said target and said sensor assembly said target is disposed in said magnetic field and said magnetic sensor element is disposed between said end of said single pole and said target with no intervening ferromagnetic pole between said magnetic sensor element and said target,
said sensor element being configured to provide said first output in response to said first level of magnetic flux when said sensor element is disposed between said end of said single pole and said target and said second output when said sensor element is not disposed between said end of said single pole and said target.

9. An apparatus according to claim 8, wherein said magnet has a length in said direction of magnetization, said length being greater than a width and height of said magnet.

10. An apparatus according to claim 8, wherein an air gap between said magnet and said target is greater than 5 mm.

11. An apparatus according to claim 8, wherein said magnetic sensor element and said end of said single pole are disposed in a sealed cavity at least partially formed by said housing.

12. An apparatus according to claim 8, said housing comprising at least one mounting flange extending from an exterior surface thereof, said mounting flange being configured for cooperating with an associated mounting opening of a mounting bracket for affixing said apparatus to said mounting bracket.

13. An apparatus comprising:
a permanent magnet magnetized in a direction of magnetization for establishing a magnetic field;
a single pole spaced from said permanent magnet and having a surface in opposed facing relationship with one magnetic pole of said permanent magnet, said single pole disposed in said magnetic field; and
a Hall Effect device disposed in said magnetic field and adjacent an end of said single pole, said Hall Effect device having a flux receiving surface and being responsive to first and second levels of flux imparted to said flux receiving surface for providing first and second outputs, respectively, said first output being different from said second output, said flux receiving surface being positioned substantially parallel to said direction of magnetization and in opposed facing relationship to said end of said single pole, said Hall Effect device being configured to provide said first output when a target is disposed in said magnetic field and said Hall Effect device is disposed between said end of said single pole and said target with no intervening ferromagnetic pole between said Hall Effect device and said target, said Hall Effect device being configured to provide said second output when Hall Effect device is not disposed between said end of said single pole and said target.

14. An apparatus according to claim 13, wherein said magnet has a length in said direction of magnetization, said length being greater than a width and height of said magnet.

15. An apparatus according to claim 13, wherein said permanent magnet, said single pole, and said magnetic sensor element are at least partially disposed in a housing and said magnetic sensor element and said end of said single pole are disposed in a sealed cavity at least partially formed by said housing.

16. An apparatus according to claim 13, wherein said permanent magnet, said single pole, and said magnetic sensor element are at least partially disposed in a housing, said housing comprising at least one mounting flange extending from an exterior surface thereof, said mounting flange being configured for cooperating with an associated mounting opening of a mounting bracket for affixing said apparatus to said mounting bracket.

17. An apparatus for sensing the position of a seat in a vehicle, said apparatus comprising:

a sensor assembly comprising a permanent magnet establishing a magnetic field, a single pole spaced from said permanent magnet and disposed in said magnetic field, and a magnetic sensor element disposed in said magnetic field and adjacent an end of said single pole, said permanent magnet, said single pole, and said magnetic sensor element are at least partially disposed in a housing and said magnetic sensor element and said end of said single pole are disposed in a sealed cavity at least partially formed by said housing; and a target comprising a ferromagnetic material, at least one of said target and said sensor assembly being configured for movement with said seat relative to the other of said target and said sensor assembly, whereby in at least one position of said at least one movable one of said target and said sensor assembly said target is disposed in said magnetic field and said magnetic sensor element is disposed between said end of said single pole and said target with no intervening ferromagnetic pole between said magnetic sensor element and said target, said sensor element being configured to provide a first output in response to a first level of magnetic flux from said magnet directed to said sensor element when said sensor element is disposed between said end of said single pole and said target and a second output different from said first output in response to a second level of magnetic flux from said magnet directed to said sensor element when said sensor element is not disposed between said end of said single pole and said target.

18. An apparatus for sensing the position of a seat in a vehicle, said apparatus comprising:

a sensor assembly comprising a permanent magnet magnetized in a direction of magnetization for establishing a magnetic field, a single pole spaced from said permanent magnet and disposed in said magnetic field, and a magnetic sensor element disposed in said magnetic field and adjacent an end of said single pole, said magnetic sensor element having a flux receiving surface and being responsive to first and second levels of flux imparted to said flux receiving surface for providing first and second outputs, respectively, said first output being different from said second output, said flux receiving surface being positioned substantially parallel to said direction of magnetization;

a housing, said permanent magnet, said single pole and said magnetic sensor element being at least partially disposed in said housing, said magnetic sensor element and said end of said single pole are disposed in a sealed cavity at least partially formed by said housing; and a target comprising a ferromagnetic material, at least one of said target and said sensor assembly being configured for movement with said seat relative to the other of said target and said sensor assembly said movement being in a direction substantially parallel to said direction of magnetization, whereby in at least one position of said at least one movable one of said target and said sensor assembly said target is disposed in said magnetic field and said magnetic sensor element is disposed between said end of said single pole and said target with no intervening ferromagnetic pole between said magnetic sensor element and said target, said sensor element being configured to provide said first output in response to said first level of magnetic flux when said sensor element is disposed between said end of said single pole and said target and said second output when said sensor element is not disposed between said end of said single pole and said target.

19. An apparatus comprising:

a permanent magnet magnetized in a direction of magnetization for establishing a magnetic field;

a single pole spaced from said permanent magnet and disposed in said magnetic field;

a Hall Effect device disposed in said magnetic field and adjacent an end of said single pole, said Hall Effect device having a flux receiving surface and being responsive to first and second levels of flux imparted to said flux receiving surface for providing first and second outputs, respectively, said first output being different from said second output, said flux receiving surface being positioned substantially parallel to said direction of magnetization; and a housing, said permanent magnet, said single pole, and said magnetic sensor element are at least partially disposed in said housing and said magnetic sensor element and said end of said single pole are disposed in a sealed cavity at least partially formed by said housing;

said Hall Effect device being configured to provide said first output when a target is disposed in said magnetic field and said Hall Effect device is disposed between said end of said single pole and said target with no intervening ferromagnetic pole between said Hall Effect device and said target, said Hall Effect device being configured to provide said second output when Hall Effect device is not disposed between said end of said single pole and said target.

* * * * *